United States Patent
Nair et al.

(10) Patent No.: US 8,963,368 B2
(45) Date of Patent: Feb. 24, 2015

(54) MAXIMUM POWER POINT TRACKING METHOD, PHOTOVOLTAIC SYSTEM CONTROLLER AND PHOTOVOLTAIC SYSTEM

(75) Inventors: Mukesh Balachandran Nair, Bangalore (IN); Nagavolu Srinivasa Murty, Bangalore (IN); Dattatreya Shankar Bhat, Bangalore (IN)

(73) Assignee: NXP B.V., Eindhoven (NL)

( * ) Notice: Subject to any disclaimer, the term of this patent is extended or adjusted under 35 U.S.C. 154(b) by 886 days.

(21) Appl. No.: 13/117,380

(22) Filed: May 27, 2011

(65) Prior Publication Data

US 2011/0291480 A1   Dec. 1, 2011

(30) Foreign Application Priority Data

May 28, 2010   (EP) .................................. 10164393

(51) Int. Cl.
  *H02J 1/00* (2006.01)
  *G05F 1/67* (2006.01)
(52) U.S. Cl.
  CPC .. *G05F 1/67* (2013.01); *Y02E 10/58* (2013.01)
  USPC ............................................ 307/43; 323/234
(58) Field of Classification Search
  CPC ..................................... G05F 1/67; G05F 1/46
  USPC ............................ 307/43, 71, 72, 82; 323/234
  See application file for complete search history.

(56) References Cited

U.S. PATENT DOCUMENTS

| | | | |
|---|---|---|---|
| 5,869,956 | A | 2/1999 | Nagao et al. |
| 2007/0027644 | A1 | 2/2007 | Bettenwort et al. |
| 2010/0289337 | A1* | 11/2010 | Stauth et al. .................. 307/77 |

FOREIGN PATENT DOCUMENTS

| | | |
|---|---|---|
| CN | 101119031 A | 2/2008 |
| CN | 101651436 A | 2/2010 |
| JP | 2006-252320 A | 9/2006 |

OTHER PUBLICATIONS

Sera, D. "Improved MPPT Algorithms for Rapidly Changing Environmental Conditions", 12$^{th}$ Int'l. Power Electronics and Motion Control Conference, 6 pgs, (2006).

Hohm, D. et al. "Comparative Study of Maximum Power Point Tracking Algorithms", Progress in Photovoltaics: Research and Applications, pp. 47-62 (2003).

(Continued)

*Primary Examiner* — Rexford Barnie
*Assistant Examiner* — Terrence Willoughby (57) ABSTRACT

Consistent with an example embodiment, a method of tracking a maximum power point (MPP) of a PV (photovoltaic) system comprises a circuit with a controller controlling a DC voltage-DC voltage converter for converting an output current of the PV system; the controller further comprises a memory. The method comprises measuring a first value of a PV system voltage at an initial MPP; storing said first value in said memory; periodically sampling a power output level of said PV system, and upon detecting a change in said power output level exceeding a first threshold, reading the first value from the memory; and adjusting a duty cycle of the DC voltage-DC voltage converter until the circuit voltage matches said first value; the method further comprising finetuning the duty cycle of the DC voltage-DC voltage converter to a further MPP following detecting a change in said power output level exceeding a first threshold.

13 Claims, 3 Drawing Sheets

(56) References Cited

OTHER PUBLICATIONS

Bazzi A. et al. "Simulation of a New Maximum Power Point Tracking Technique for Multiple Photovoltaic Arrays", IEEE Int'l. Conf. on Electro/Information Technology, pp. 175-178 (May 2008).

Liu, X. et al. "An Improved Perturbation and Observation Maximum Power Point Tracking Algorithm for PV Arrays" 35th Annual IEEE Power Electronics Specialists Conf., vol. 3, pp. 2005-2010 (2004).

Villalva, M. et al. "Analysis and Stimulation of the P&O MPPT Algorithm Using a Linearized PV Array Model", $35^{th}$ Annual Conf. of IEEE Industrial Electronics, pp. 231-236 (2009).

Femia, N. et al. "Optimizing Sampling Rate of P&O MPPT Technique", $35^{th}$ Annual IEEE Power Electronics Specialists Conf., vol. 3, pp. 1945-1949 (2004).

Extended European Search Report for European Patent Application No. 10164393.0 (Nov. 18, 2010).

\* cited by examiner

FIG. 4

MAXIMUM POWER POINT TRACKING METHOD, PHOTOVOLTAIC SYSTEM CONTROLLER AND PHOTOVOLTAIC SYSTEM

This application claims the priority under 35 U.S.C. §119 of European patent application no. 10164393.0, filed on May 28, 2010, the contents of which are incorporated by reference herein.

FIELD OF THE INVENTION

The present invention relates to a method of tracking a maximum power point of a photovoltaic system comprising a circuit including a controller controlling a direct current (DC) voltage to DC voltage converter for converting an output current of the photovoltaic system.

The present invention further relates to a photovoltaic system controller implementing such a method.

The present invention yet further relates to a photovoltaic system comprising such a photovoltaic system controller.

BACKGROUND OF THE INVENTION

Renewable energy generation is attracting considerable attention for a number of reasons. Firstly, renewable energy is considered the preferred alternative to fossil fuel based energy generation in order to combat greenhouse gas emissions such as $CO_2$, which are held responsible for the changes to global climates. Secondly, with supplies of fossil fuels, and in particular oil, expected to run out in the foreseeable future, alternative energy supplies must be found for future generations.

Harvesting solar energy is one of the most promising ways of generating renewable energies, due to the abundant nature of the energy source, which is freely available across the globe. Over the last two decades, solar energy conversion has increasingly contributed to the generation of energy supplies all around the world. Typically, solar energy is converted into heat or into electricity, the latter typically being achieved by arrays of photovoltaic cells. The energy generated by such a photovoltaic system is typically stored in one or more batteries to make the electricity available on demand.

It is well-known that if a load is directly connected to the output of a photovoltaic system, the arrangement operates at a less than optimal efficiency. This is for instance explained in FIG. 1, in which the I-V curve (solid line) of the photovoltaic system at a given irradiation intensity is depicted together with such a load (dashed line). The system's operating point is determined by the intersection of the I-V curve with the load profile. In the FIG. 1, the operating point is at a lower power point instead of at the maximum power point (MPP), which is the point on the I-V curve where the product of the operating voltage and current, i.e. the output power is at a maximum.

For this reason, photovoltaic systems typically comprise a photovoltaic system controller that matches the load or impedance of the circuit connected to the photovoltaic cells in order to ensure that the photovoltaic system operates at the maximum power point by means of controlling the duty cycle of a DC voltage-DC voltage converter that converts the direct current voltage generated by photovoltaic cells into a further voltage. This, however, is not a trivial exercise as the maximum power point is not known a priori, and is subject to variation, for instance because of changes in irradiation intensity and/or temperature and/or partial shadowing. To this end, such controllers typically implement some algorithm that actively tracks the maximum power point of the photovoltaic system.

An overview of commonly used algorithms can be found in "Comparative Study of Maximum Power Point Tracking Algorithms" by D. P. Hohm and M. E. Ropp in Progress in Photovoltaics: Research and Applications, Vol. 11 (2003), pages 47-62. The most commonly used algorithms include Perturb and Observe (P&O), in which the power output of the photovoltaic array is monitored, and the duty cycle, e.g. the pulse width, of the DC voltage-DC voltage converter of the photovoltaic system controller is adjusted as a function of the monitored power output in order to move the operating voltage of the photovoltaic array as close as possible to its maximum power point.

A drawback of the P&O algorithm is that its convergence to the maximum power point can be slow, and that shifts in the maximum power point during execution of the algorithm can cause the power point of the photovoltaic system to oscillate around the maximum power point, or even diverge from the maximum power point.

Another commonly used algorithm is the incremental conductance (INC) algorithm, which monitors changes in the conductance of the photovoltaic system to adjust the duty cycle of the DC converter, based on the knowledge that at the maximum power point, the term $dP/dV$, i.e. the differential of the system power P with respect to its operating voltage V is zero. Although the INC algorithm has an improved performance compared to the P&O algorithm under rapidly changing irradiance, it is sensitive to noise and quantization errors, which can cause the system's operating point to oscillate around the maximum power point.

Yet another commonly used algorithm for MPP tracking is the constant voltage algorithm, which is based on the realization that the ratio between the maximum power voltage of the photovoltaic cell array and the open-circuit voltage is more or less constant for different I-V curves of the photovoltaic system. A drawback of this algorithm is that the MPP voltage is not always a fixed percentage of the open circuit voltage, as it depends on manufacturing process, quality of materials and other factors, and therefore requires frequent measurement of the open-circuit voltage in order to accurately track MPP, as the MPP can vary quite often due to changes in e.g. irradiance, temperature and partial shadowing. During the open-circuit voltage measurement, the battery of the photovoltaic system cannot be charged, i.e. the power output of the photovoltaic cell array is lost, thereby reducing the efficiency of the photovoltaic system.

Ali M Bazzi and Sami H Karaki, "Simulation of a New Maximum Power Point Tracking Technique for Multiple Photovoltaic Arrays", discloses a two-stage maximum power point tracking (MPPT) technique for multiple photovoltaic arrays operating under different levels of irradiance and temperature. The first stage finds a point that bypasses local maxima and moves the operating point of the PV arrays near the global MPP. The second stage is a normal MPPT technique that finds the exact global maximum.

SUMMARY OF THE INVENTION

The present invention seeks to provide an improved method of tracking the maximum power point of a photovoltaic system.

The present invention further seeks to provide a photovoltaic system controller implementing the improved method.

The present invention yet further seeks to provide a photovoltaic system including such a photovoltaic system controller.

The present invention yet further seeks to provide a computer program product for implementing the improved method of the present invention.

In accordance with a first aspect of the present invention, there is provided a method of tracking a maximum power point of a photovoltaic system comprising a circuit including a controller controlling a DC voltage-DC voltage converter for converting an output current of the photovoltaic system, the controller further comprising a memory, the method comprising measuring a first value of a photovoltaic system voltage at an initial maximum power point; storing said first value in said memory; periodically sampling a power output level of said photovoltaic system, and upon detecting a change in said power output level exceeding a first threshold, reading the first value from the memory; and adjusting a duty cycle of the DC voltage-DC voltage converter until the circuit voltage matches said first value; the method further comprising fine-tuning the duty cycle of the DC voltage-DC voltage converter to a further maximum power point following detecting a change in said power output level exceeding a first threshold.

In this method, relatively large changes in the output power of the photovoltaic array, which are indicative of changes in illumination levels, and which shift the operating point of the photovoltaic system relatively far from its MPP are compensated in a two-step process, in which the operating voltage of a previously established MPP is used as a reference voltage to bring the operating point of the photovoltaic system in the vicinity of its adjusted MPP, after which a fine-tuning step is used, e.g. using a P&O or INC algorithm to find the adjusted MPP. For smaller changes of the in the output power of the photovoltaic array, the reference voltage application step may be skipped; in other words, relatively small changes in the operating point may be compensated using fine-tuning algorithms only. This MPP tracking method of the present invention has the advantage that can more rapidly converge to an adjusted MPP compared to P&O and INC methods for large changes in the illumination conditions of the photovoltaic system, whereas compared to the CV method, an improved efficiency is achieved because the tracking of the variation in power output does not require the frequent measurement of the open circuit voltage of the photovoltaic system.

The method further comprises, upon detecting a change in said power output level exceeding a first threshold, determining the actual value of the photovoltaic system voltage and comparing said actual value with the first value, wherein the execution of the steps of reading the first value from the memory and adjusting a duty cycle of the DC voltage-DC voltage converter until the circuit voltage matches said first value is conditional upon a difference between the actual value with the first value exceeding a further threshold.

Preferably, detecting said change in power level comprises detecting said change as a function of the delay between subsequent samples. In other words, by determining the differential power output (dP/dt) of the photovoltaic system, a constant voltage monitoring approach can be adopted without requiring the frequent measurement of the open circuit voltage, thereby limiting the disruptions to the charging of the battery of the photovoltaic system.

In an embodiment, said fine-tuning comprises tracking the power output of the photovoltaic system following said adjusting step; and adjusting the power output of the photovoltaic system by alternately increasing and decreasing the duty cycle of the DC voltage-DC voltage converter until a further maximum power point of the photovoltaic system is reached.

Preferably, in this fine-tuning step, the step of increasing the duty cycle of the DC voltage-DC voltage converter comprises stepwise increasing the duty cycle of the DC voltage-DC voltage converter in a number of steps each having a defined step size and measuring the power output of the photovoltaic system after each step until the power output measured after the penultimate step exceeds the power output measured after the last step; the step of decreasing the duty cycle of the DC voltage-DC voltage converter comprises stepwise decreasing the duty cycle of the DC voltage-DC voltage converter in a number of steps each having a defined step size and measuring the power output of the photovoltaic system after each step until the power output measured after the penultimate step exceeds the power output measured after the last step; and reducing the defined step size following the termination of a stepwise increasing or stepwise decreasing of said duty cycle.

The combination of an increase-decrease-increase fine-tuning cycle or a decrease-increase-decrease fine-tuning cycle of the duty cycle, e.g. the pulse width of the DC voltage-DC voltage converter, with a reduction in step size between cycles leads to a rapid convergence to the MPP of the photovoltaic system.

In an embodiment, the total number of alternate increases and decreases of the duty cycle is 3, as it has been found that three cycles, e.g. increase-decrease-increase or decrease-increase-decrease is sufficient to converge at the MPP, especially when the step size is reduced for each subsequent step sequence.

In an embodiment, after the adjusted MPP has been determined, the method may further comprise measuring a second value of the circuit voltage at said further maximum power point; and storing said second value in said memory. This second value may be used in a next MPP tracking step, where it may provide a more accurate estimation than the first value, especially when both changes in power output were in the same direction.

In another embodiment, the step of tracking the power output of the photovoltaic system following said adjusting step comprises performing a two-point power output measurement for determining a differential power output of the photovoltaic system; and initiating said adjusting step if the differential power output lies below a second threshold. This has the advantage that the fine-tuning of the duty cycle of the DC voltage-DC voltage converter is only performed when the illumination levels to which the photovoltaic cells are exposed exhibit no substantial variations, thus reducing the risk of the photovoltaic system entering a mode of operation in which the power point oscillates around the MPP.

The method may further comprise performing a two-point power output measurement for determining a differential power output of the photovoltaic system during said fine-tuning; and restarting said fine-tuning upon said determined differential power output exceeding a third threshold. In this embodiment, a fine-tuning process is aborted and restarted if during the fine-tuning a substantial shift in the power output, indicative of a change in illumination levels, is detected. This prevents the MPP tracking to diverge from the MPP due to such sudden changes in illumination levels, which shift the MPP away from its previous location.

In accordance with another aspect of the present invention, there is provided a photovoltaic system controller comprising a DC voltage-DC voltage converter for converting the direct current from a photovoltaic system into a further current; and a controller for controlling the duty cycle of the DC voltage-DC voltage converter, wherein the controller comprises a memory and a microprocessor having a set of instructions for implementing the MPP tracking method of the present invention. Such instructions may be made available in a soft-coded form in an instruction memory accessible to the controller for controlling the duty cycle of the DC voltage-DC voltage converter, or in hard-coded form, e.g. instructions provided in the form of hardware functionality of the microprocessor.

In accordance with yet another aspect of the present invention, there is provided a photovoltaic system, comprising the photovoltaic system controller of the present invention, the system further comprising at least one photovoltaic cell having an output conductively coupled to an input of the DC voltage-DC voltage converter. Such a photovoltaic system benefits from an improved tracking of the MPP under varying conditions, thereby improving the efficiency of the photovoltaic system.

In an embodiment, the photovoltaic system may further comprise at least one battery having an input conductively coupled to an output of the DC voltage-DC voltage converter for storing the charge generated by the at least one photovoltaic cell.

In another embodiment, the photovoltaic system further comprises a sensor for sensing the power output of the at least one photovoltaic cell, the controller being responsive to said sensor.

In accordance with a further aspect of the present invention, there is provided a computer program product comprising program code for, when executed on a computer processor, executing the steps of the method of the present invention. Such a computer program product may be made available on any suitable computer-readable medium, such as a CD-ROM, DVD, memory stack, portable hard disk, a network-accessible server and so on.

BRIEF DESCRIPTION OF THE EMBODIMENTS

Embodiments of the invention are described in more detail and by way of non-limiting examples with reference to the accompanying drawings, wherein.

DETAILED DESCRIPTION OF THE DRAWINGS

It should be understood that the Figures are merely schematic and are not drawn to scale. It should also be understood that the same reference numerals are used throughout the Figures to indicate the same or similar parts.

Figure 2:
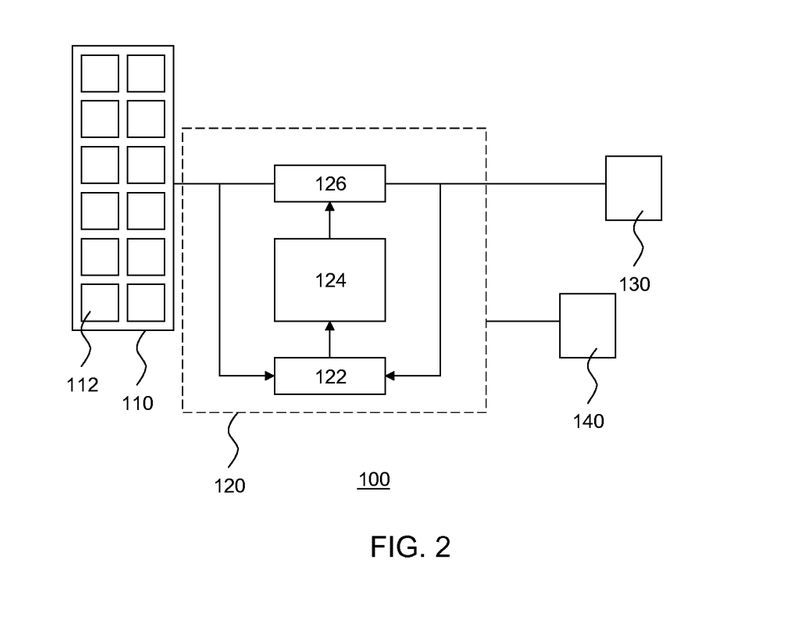
FIG. 2 schematically depicts a photovoltaic (PV) system in accordance with an embodiment of the present invention.

FIG. 2 depicts a typical PV system 100, comprising an array 110 of PV cells 112 coupled to a battery 130 via a charge unit 120, which comprises a DC voltage-DC voltage converter 126, the duty cycle of which is controlled by a controller 124, which in turn is responsive to one or more sensors 122 arranged to measure the output power and output voltage of the one or more PV cells 112. The duty cycle of the DC voltage-DC voltage converter 126 may be controlled in any suitable fashion, e.g. by means of pulse width modulation. Such techniques are well-known per se and will therefore not be further discussed for the sake of brevity.

Figure 1:
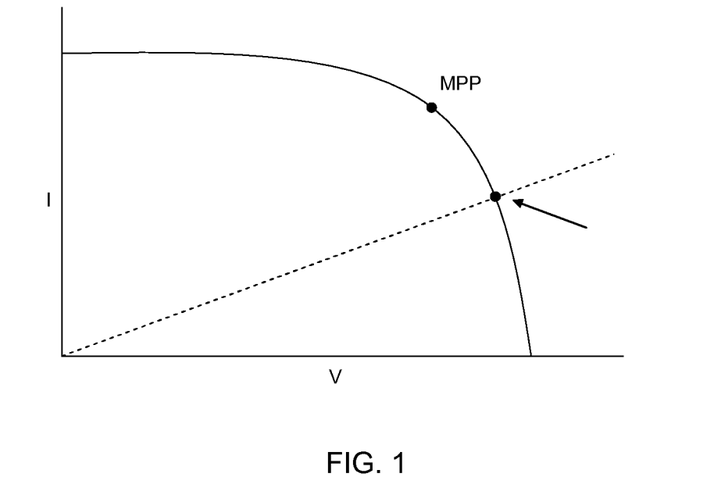
FIG. 1 depicts an IV curve of a photovoltaic system having a load directly coupled to its output.

The solar charger 120 and battery 130 represent a load 140 sensed by the array 110, which governs the operating point on the I-V curve of the array 110 as previously explained with the aid of FIG. 1. By variation of the duty cycle of the DC voltage-DC voltage converter 126, the impedance of the load may be varied, such that the load characteristics and the I-V curve may be tuned to intersect at the MPP. At a constant duty cycle, the impedance of the load 140 is constant, such that in accordance with Ohm's law (V=I*R), a change in the I-V characteristics of the array 110 causes a change in the operating voltage of the array 110, which typically shifts the operating point of the array 110 away from the adjusted MPP.

Figure 3:
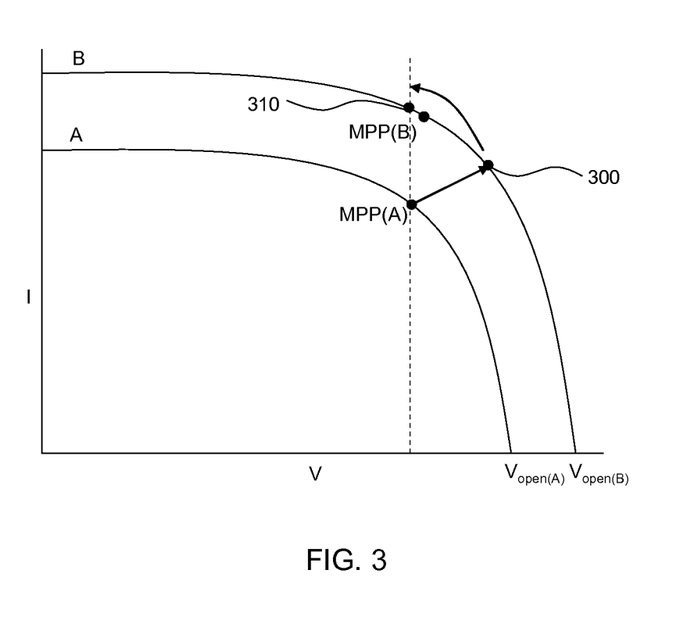
FIG. 3 schematically depicts an aspect of an embodiment of the MPP tracking method of the present invention.

This is explained in more detail with the aid of FIG. 3, in which a PV system 100 initially exhibits I-V characteristics as depicted by I-V curve A, with the DC voltage-DC voltage converter 126 being configured to operate at MPP(A) by appropriate control of the duty cycle of the DC voltage-DC voltage converter 126. The I-V characteristics of the PV system 100 may change, e.g. because of changing illumination conditions, causing the PV system 100 to adopt I-V characteristics depicted by I-V curve B. This causes the operating point of the PV system 100 to shift from MPP (A) to point 300, which is relatively far removed from MPP(B), i.e. the maximum power point of the altered I-V characteristics of the PV system 100, such that the PV system 100 now operates under non-optimal efficiency conditions.

It is important to limit the loss of efficiency as much as possible. For this reason, it is important that the controller 124 is capable of rapidly adjusting the duty cycle of the DC voltage-DC voltage converter 126 such that the operating point of the PV system 100 is shifted towards MPP(B). This is achieved by configuring the controller 124 to execute an embodiment of the method of the present invention.

In general, the method of the present invention uses differential power or deviation in PV voltage tracking to define a cause of action to be taken. In other words, at least some of the sensors 122 are configured to measure the power output of the PV array 110, with the controller 124 being configured to determine the dP/dt, i.e. the differential power between two unperturbed power measurements. In the context of the present invention, an unperturbed power measurement is a measurement in which the user-defined settings of the PV system are unaltered with respect to the previous measurement. In an embodiment, the controller 124 will calculate the difference between the power outputs measured in these two measurements and divide this difference by the time delay between the two measurements to determine the differential power.

The present invention is based on the realization that for relatively small dP/dt values, a modified P&O-based tracking algorithm can suffice to rapidly converge to the shifted MPP value, as the actual operating voltage of the PV system 100 is still relatively near the operating voltage of the MPP of the adjusted I-V curve of the PV system 100, whereas for larger dP/dt values, a novel and inventive two-step algorithm is applied in which in a first step the operating voltage of the PV system 100 is brought to a value that is expected to lie in the vicinity of the operating voltage at the MPP, after which the aforementioned tracking algorithm may be used to fine-tune the operating voltage to arrive to the MPP voltage.

This is achieved by measuring and storing the initial MPP voltage MPP(A) in a memory of the microcontroller 124, and restoring the initial MPP voltage upon the detection of a dP/dt value exceeding a predefined threshold indicative of a change in I-V characteristics caused by a change in irradiation intensity levels. This is shown in FIG. 3, which depicts different I-V curves A and B with their respective open circuit voltages Vopen(A) and Vopen (B) as well as their respective MPPs MPP(A) and MPP(B), by the shift in operating voltage from point 300, which is the effective operating voltage on I-V curve (B) for the duty cycle value of the DC voltage-DC voltage converter 126 at MPP(A), to point 310, which is the operating voltage of MPP(A) on I-V curve (B). This change may be effected by adjusting the duty cycle of the DC converter 126 with the microcontroller 124 whilst monitoring the operating voltage of the PV system 100 until the operating voltage reaches the value stored in the memory of the microcontroller 124.

This is based on the insight that for changes in I-V characteristics induced by a change in irradiation intensity levels, the change in MPP as a function of the operating voltage is relatively small, such that bringing the PV system 100 to the MPP operating voltage, i.e. MPP(A), of the I-V characteristics that were applicable prior to the change in irradiation intensity levels ensures that the adjusted operating voltage reached by restoring this previous value of the MPP operating voltage lies close to the expected new value of the MPP operating voltage such that in the second step tracking algorithms such as P&O algorithms can be used to quickly converge to the new MPP, i.e. MPP(B) as such algorithms are known to be capable of such fast convergence if the starting point of the tracking process lies in the vicinity of the desired end point, i.e. MPP(B).

At this point it is noted that the change in the I-V characteristics caused by a change in the PV array irradiation intensity levels is typically much larger than a change caused by a change in the operating temperature of the PV system 100. Hence, by an appropriate choice of the threshold against which the determined dP/dt value is compared, it is possible to only invoke the two-step MPP tracking algorithm when the change in I-V characteristics is dominated by a change in the irradiation intensity levels.

Figure 4:
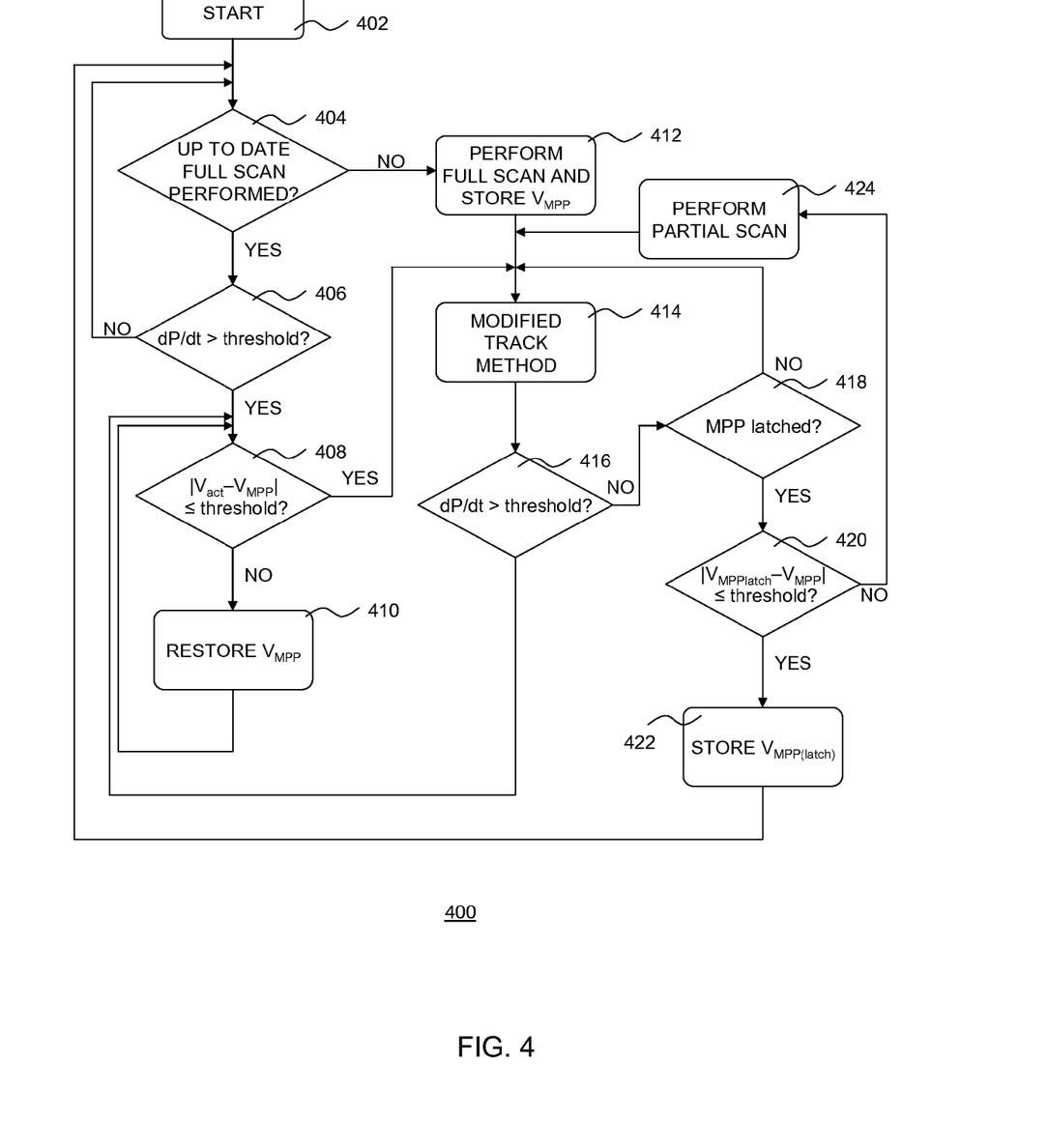
FIG. 4 schematically depicts another aspect of an embodiment of the MPP tracking method of the present invention.

A more detailed explanation of a preferred embodiment of the method of the present invention will now be given with the aid of FIG. 4, which depicts a flowchart of this preferred embodiment. The method 400 starts in step 402, after which the method proceeds to step 404 in which it is checked if a full scan of the I-V curve has been performed within a predefined time window.

In a full scan, the load may be varied from zero to infinity to track the PV panel IV curve from short circuit current to open circuit voltage in order to determine the maximum power point afresh. In an embodiment of the present invention, this is done by sweeping the duty cycle of the DC voltage-DC voltage converter 126 through its full range, i.e. from its minimum to maximum feasible duty cycle value.

Such a full scan is necessary to compensate for system drift and to determine the initial MPP and configure the duty cycle of the DC voltage-DC voltage converter 126 such that the PV system 100 operates at the MPP operation point. The full scan is performed in step 412, in which after determining the MPP, the operating voltage of the PV system 100 is measured and stored in the memory of the controller 124. If a recent full scan has been performed, the method may proceed to step 406 instead.

Once the PV system 100 has been calibrated in this manner, the method may proceed to step 414, in which the operating point of the PV system 100 is fine-tuned using a modified P&O tracking algorithm, which will be explained in more detail later. At this stage, if the modified tracking step 414 has successfully completed, the MPP tracking method enters a dormant state, in which it is assumed that the PV system operates at the MPP until a change in dP/dt, i.e. the differential power output of the system, exceeds a predefined threshold, as indicated in steps 406 and 416. To this end, the method executed by the controller 124 periodically determines an output power of the PV array 110 with the aid of the one or more sensors 122.

It is noted that in an embodiment, the determination of dP/dt by the controller 124 also takes place during execution of modified tracking step 414. This is reflected by step 418, where it is checked if upon detection of dP/dt becoming non-negligible but not exceeding the predefined threshold, e.g. 0<dP/dt<threshold, the modified tracking step 414 has successfully completed. If not, the method reverts back to step 414 to restart the modified tracking step 414 from the beginning. This has the advantage that upon small changes operating conditions of the PV array 110, e.g. operating temperature changes, the P&O based tracking algorithm is prevented from oscillating around or diverging from the actual MPP of the PV system 100.

In an embodiment, upon completing the modified tracking step 414 and determining in step 418 that the modified tracking step 414 has resulted in the PV system 100 latching onto its actual MPP, it may be checked in step 420 if the difference between the actual MPP operating voltage and the MPP operating voltage stored in the memory of the controller exceeds a predefined threshold. This useful because as previously explained, the values of the MPP operating voltage exhibit relatively small variations under strongly varying illumination conditions for the PV array 110. Hence, the detection of a larger than expected difference between a previously determined MPP operating voltage and the operating voltage measured in step 420 is an indication of the PV system 100 operating under sub-optimal conditions, for instance because of system drift or because of the modified tracking step 414 latching onto a pseudo-peak of the actual I-V curve of the PV system 100.

This may be rectified by performing a partial scan of the I-V characteristics of the PV system 100 in step 424 to bring the operating point of the PV system into the vicinity of its actual MPP, after which the modified tracking of the MPP, i.e. step 414, may be repeated to latch onto the actual MPP. A partial scan is typically performed in a predefined subrange of the full PV voltage range, for instance from 12V to 19V by changing the duty cycle over a smaller range. This is faster than a full scan and therefore leads to a lower PV power loss.

On the other hand, if after the completion of steps 418 and 420 it is decided that the modified tracking algorithm executed in step 414 has latched onto the MPP of the PV system 100, the method may proceed to step 422 in which the measured voltage of the latched MPP is stored in the memory of the controller 124. This may be done by overwriting the previously stored MPP voltage or by adding the latched MPP voltage to the memory. The latter option has the advantage that the sign of the dP/dt measurement may be used to decide which MPP value is to be retrieved from the memory.

For instance, the controller 124 may keep track of which is the most recent MPP voltage value stored in its memory and, upon a dP/dt measurement exceeding a predefined threshold indicative of an increase in illumination levels of the PV array 110, may check if a higher value MPP voltage is available in its memory and decide to restore this value instead of the most recently stored MPP voltage value, as the higher MPP voltage value can be expected to provide a more accurate estimate of the altered MPP voltage of the PV system 110. Similarly, upon a dP/dt measurement exceeding a predefined threshold indicative of an decrease in illumination levels of the PV array 110, the controller 124 may check if a lower value MPP voltage is available in its memory and decide to restore this value instead of the most recently stored MPP voltage value, as the lower MPP voltage value can be expected to provide a more accurate estimate of the altered MPP voltage of the PV system 110.

As previously mentioned, once the PV system 100 is latched to its MPP, it is periodically checked in step 406 if dP/dt has exceeded a predefined threshold, as this is indicative of the operating point of the PV system having moved away from its MPP. If the determined dP/dt does not exceed the predefined threshold, it may be assumed that the PV system 100 still operates at its MPP, such that the method may revert back to step 404 to check if the last performed full scan is still up to date, the outcome of this check leading to the method progressing to either step 412 or 406.

However, if it is determined in step 406 that the absolute value of dP/dt exceeds the predefined threshold, it will be necessary to adjust the duty cycle of the DC voltage-DC voltage converter 126 to bring the operating point of the PV system 100 back to its MPP. As previously explained, for relatively small changes in the output power of the PV system 100, this may be achieved by reactivating the MPP tracking algorithm in step 414, whereas for larger changes in the output power of the PV system 100, a two-step recalibration approach in which the operating voltage corresponding to the last known MPP of the PV system 100 is restored, after which the method may proceed to step 414 for fine-tuning the operating voltage of the PV system 100 using the tracking algorithm.

To this end, it may be checked in step 408 if the difference between the actual operating voltage of the PV system 100 and the MPP voltage stored in the memory of the controller 120 exceeds a predefined threshold. If this difference is small enough, this is an indication that the current operating point of the PV system 100 still lies in the vicinity of its current MPP, such that the method 400 may immediately proceed to step 414. However, if this difference is relatively large, i.e. exceeds the predefined threshold, the operating point has shifted substantially, such that a faster convergence to the current MPP is achieved by first restoring the operating voltage of the last known MPP by appropriate adjustment of the duty cycle of the DC voltage-DC voltage converter 126 in step 410 before proceeding to step 414 or reverting to step 412. Reverting back to step 412 is preferred as this facilitates detection of further changes to the operation conditions of the PV system 100 which may have occurred during restoration of the MPP voltage in step 410.

It should be understood that step 408 may be omitted from the method 400, in which case step 406 may be amended to compare the determined value of dP/dt against two thresholds T1 and T2, with T1<T2. T1 is indicative of a change in operating conditions caused by e.g. temperature variations, whereas T2 is indicative of a change in operating conditions caused by e.g. illumination intensity variations. There are three possible scenarios in this embodiment:
(a) dP/dt≤T1→the method proceeds to step 404;
(b) T1<dP/dt≤T2→the method proceeds to step 414; and
(c) T2<dP/dt→the method proceeds to step 410.

Figure 5:
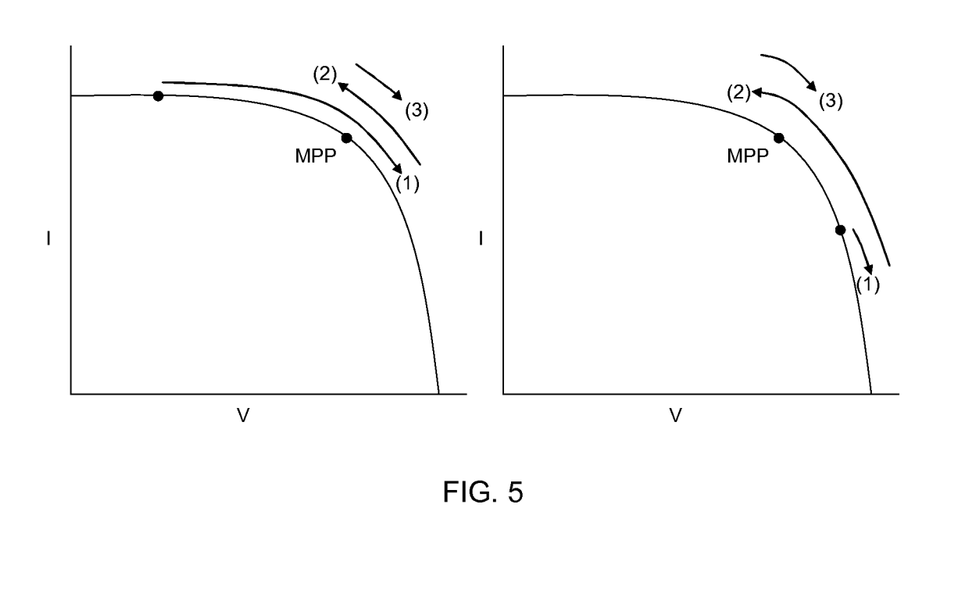
FIG. 5 depicts a flow chart of an embodiment of the method of the present invention.

A non-limiting example of an embodiment of the tracking algorithm executed in step 414 of method 400 will now be explained in more detail with the aid of FIG. 5. In this example, a modified version of the P&O tracking algorithm will be described, although it should be understood that other suitable algorithms, e.g. INC-based algorithms are also feasible.

The proposed tracking algorithm is based on an alternating pattern of tracking runs in opposite directions on the I-V curve of the PV system 100. In other words, in an initial tracking run, the duty cycle of the DC voltage-DC voltage converter 126 is systematically varied in one direction, e.g. systematically increased or systematically decreased, with the next tracking run being performed in the opposite direction. Each tracking run comprises a number of steps having a predefined step size, with the sensors 122 determining an output power of the PV array 110 after each step, with the controller 124 comparing the most recently measured output power ($P_{act}$) with the output power sampled after the previously performed step ($P_{act-1}$). A tracking run is terminated when $P_{act}<P_{act-1}$, after the next tracking run in the opposite direction is initiated.

In an embodiment, the step size of the next tracking run is reduced with respect to the step size of the last performed tracking run. In the context of the present invention, the step size is the amount by which the duty cycle, e.g. the pulse width, of the DC voltage-DC voltage converter 126 is varied. By reducing the step size in a systematic manner, e.g. halve the step size after each tracking run, a fast convergence to MPP can be achieved. It has been found that as few as three tracking runs are sufficient to latch the PV system 100 to its actual MPP.

In another embodiment, the step size may be adjusted within a single tracking run based on the magnitude of the difference between $P_{act}$ and $P_{act-1}$, with the step size being reduced if this difference becomes smaller, such that an even faster convergence to MPP can be achieved.

An advantageous aspect of the above tracking algorithm is that the direction of the initial tracking run is independent of on which side of MPP the actual operating point of the PV system 100 lies. This is demonstrated in FIG. 5, in which a three-run tracking algorithm implementing an alternating pattern of a systematic decrease (1), a systematic increase (2) and a systematic decrease (3) of the duty cycle of the DC voltage-DC voltage converter 126 results in the convergence to MPP from a starting operating voltage having a lower value than MPP as shown in the left pane of FIG. 5, as well as from a starting operating voltage having a higher value than MPP as shown in the right pane of FIG. 5. It should be understood that although not explicitly shown, the same result can be achieved with a tracking algorithm starting with a systematic increase of the duty cycle of the DC voltage-DC voltage converter 126, e.g. an increase-decrease-increase algorithm. Further tracking runs may be added to the algorithm.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of tracking a maximum power point of a photovoltaic system including a circuit including a controller controlling a DC voltage-DC voltage converter for converting an output current of the photovoltaic system, the controller including a memory, the method comprising:
- measuring a first value of a photovoltaic system operating voltage at an initial maximum power point;
- storing said first value in the memory;
- periodically sampling a power output level of the photovoltaic system, and upon detecting a change in the power output level exceeding a first threshold,
  - determining the actual value of the photovoltaic system operating voltage and comparing the actual value with the first value, and
  - conditional upon a difference between the actual value and the first value exceeding a further threshold:
    - reading the first value from the memory and
    - adjusting a duty cycle of the DC voltage-DC converter until the photovoltaic system operating voltage matches the first value;
- the method further comprising, upon detecting a change in the power output level exceeding the first threshold, fine tuning the duty cycle for the DC voltage-DC voltage converter to a further maximum power point.

2. The method of claim 1, wherein detecting the change in power level comprises detecting the change as a function of the delay between subsequent samples.

3. The method of claim 1, wherein said fine-tuning comprises:
- tracking the power output of the photovoltaic system following said adjusting step; and
- adjusting the power output of the photovoltaic system by alternately increasing and decreasing the duty cycle of the DC voltage-DC voltage converter until a further maximum power point of the photovoltaic system is reached.

4. The method of claim 3, further comprising:
- measuring a second value of the photovoltaic system operating voltage at the further maximum power point; and
- storing the second value in the memory, by overwriting the first value or by adding the second value to the memory.

5. The method of claim 4, wherein:
- the step of increasing the duty cycle of the DC voltage-DC voltage converter comprises stepwise increasing the duty cycle of the DC voltage-DC voltage converter in a number of steps each having a defined step size and measuring the power output of the photovoltaic system after each step until the power output measured after the penultimate step exceeds the power output measured after the last step;
- the step of decreasing the duty cycle of the DC voltage-DC voltage converter comprises stepwise decreasing the duty cycle of the DC voltage-DC voltage converter in a number of steps each having a defined step size and measuring the power output of the photovoltaic system after each step until the power output measured after the penultimate step exceeds the power output measured after the last step; and
- reducing the defined step size following the termination of a stepwise increasing or stepwise decreasing of the duty cycle.

6. The method of claim 4, wherein the total number of alternate increases and decreases of the duty cycle is 3.

7. The method of claim 4, wherein the step of tracking the power output of the photovoltaic system following said adjusting step comprises performing a two-point power output measurement for determining a differential power output of the photovoltaic system; and
- initiating said adjusting step of the differential power output lies below a second threshold.

8. The method of claim 7, further comprising:
- performing a two-point power output measurement for determining a differential power output of the photovoltaic system during said fine-tuning; and
- restarting said fine-tuning upon said determined differential power output exceeding a third threshold.

9. A photovoltaic system controller comprising:
- a DC voltage-DC voltage converter for converting a direct current from a photovoltaic system into a further current; and
- a controller for controlling a duty cycle of the DC voltage-DC voltage converter,
- wherein the controller comprises a memory and a microprocessor having a set of instructions for implementing the method of claim 1.

10. A photovoltaic system, comprising the photovoltaic system controller of claim 9, the system further comprising at least one photovoltaic cell having an output conductively coupled to an input of the DC voltage-DC voltage converter.

11. The photovoltaic system of claim 10, further comprising at least one battery having an input conductively coupled to an output of the DC voltage-DC voltage converter.

12. The photovoltaic system of claim 10, further comprising a sensor for sensing the power output of the at least one photovoltaic cell, the controller being responsive to said sensor.

13. A computer program product, stored on a non-transitory computer-readable medium, comprising program code for, when executed on a computer processor, executing the steps of the method of claim 1.

* * * * *